United States Patent [19]

Sandell et al.

[11] Patent Number: 5,903,542

[45] Date of Patent: May 11, 1999

[54] PROTECTIVE CARTRIDGE FOR REWRITABLE OPTICAL DISK

[75] Inventors: Patrick Sandell, Barrington; Mohamed Agha, Hoffman Estates; Curtis G. Olsen, Mundelein, all of Ill.

[73] Assignee: Opticord, Inc., Palatine, Ill.

[21] Appl. No.: 08/963,574

[22] Filed: Nov. 6, 1997

Related U.S. Application Data

[63] Continuation of application No. 08/643,001, May 3, 1996, abandoned, which is a continuation-in-part of application No. 08/505,370, Jul. 21, 1995, abandoned, which is a continuation of application No. 08/210,872, Mar. 18, 1994, abandoned.

[51] Int. Cl.[6] .............................. G11B 3/70; G11B 23/03
[52] U.S. Cl. ........................................... 369/291; 360/133
[58] Field of Search ..................... 369/291, 77.1–77.2, 369/75.1–75.2; 360/133, 60, 99.02, 99.06

[56] References Cited

U.S. PATENT DOCUMENTS

| 4,669,078 | 5/1987 | Ogusu | 369/291 |
|---|---|---|---|
| 4,702,369 | 10/1987 | Philosophe | 206/312 |
| 4,746,013 | 5/1988 | Suzuki et al. | 206/309 |
| 4,908,817 | 3/1990 | Sandell et al. | 369/291 |
| 5,268,808 | 12/1993 | Childers | 360/133 |
| 5,475,674 | 12/1995 | Yamashita et al. | 369/291 |
| 5,579,297 | 11/1996 | Childers et al. | 369/291 |
| 5,719,851 | 2/1998 | Yen | 369/291 |

*Primary Examiner*—Allen T. Cao
*Attorney, Agent, or Firm*—Leydig, Voit & Mayer, Ltd.

[57] ABSTRACT

A rewritable optical disk is protectively enclosed in a cartridge having a base and having a hinged cover which is swingable to an open position permitting removal of the disk from the cartridge. A door with shutters is slidable on the cartridge between open and closed positions relative to access apertures formed in the cover and the base. The shutter for the access aperture in the cover is hinged relative to the remainder of the sliding door to enable that shutter to swing as the cover is opened and closed. The cover carries an axially and radially floatable hub which co-acts with the optical disk and the spindle of the disk drive to establish a precisely concentric relation between the disk and the spindle.

32 Claims, 13 Drawing Sheets

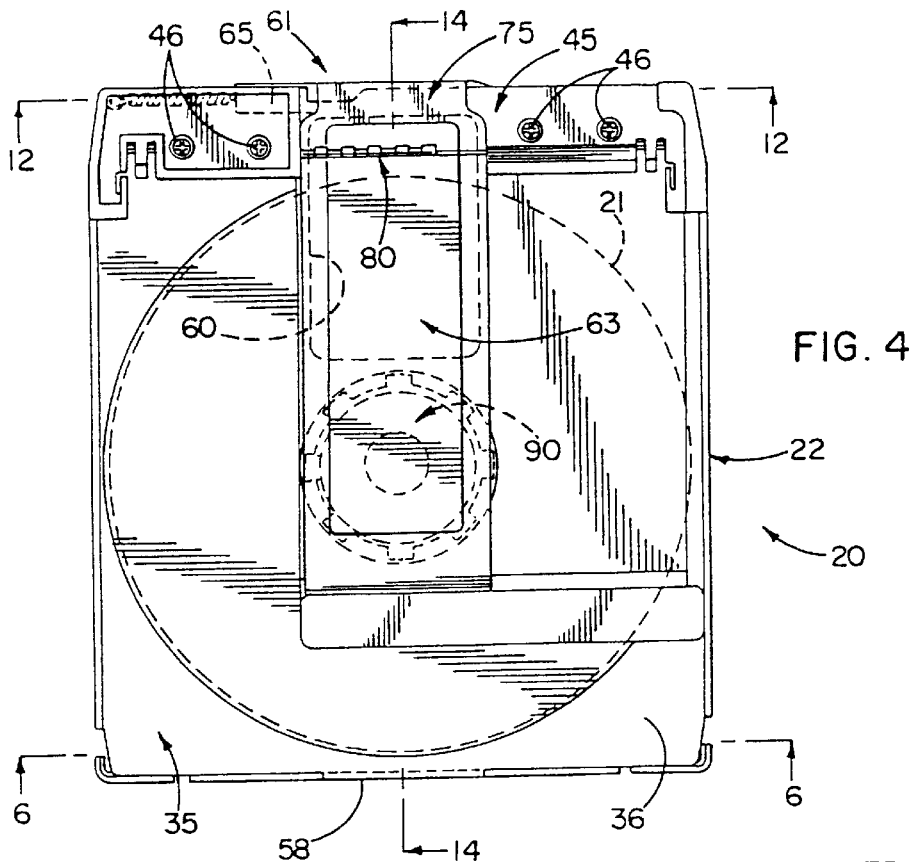
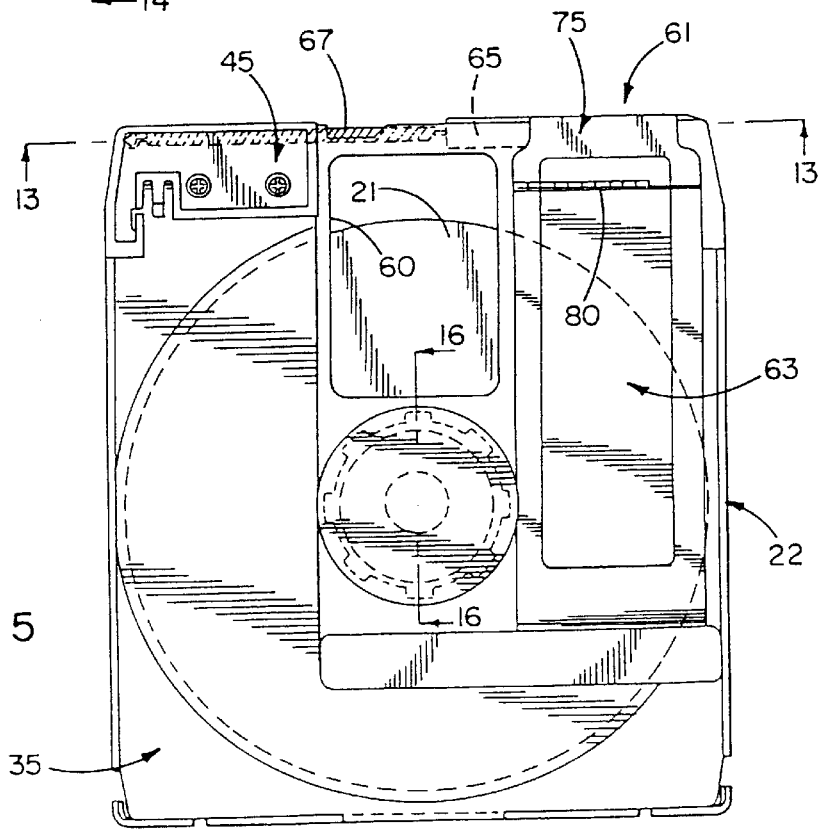

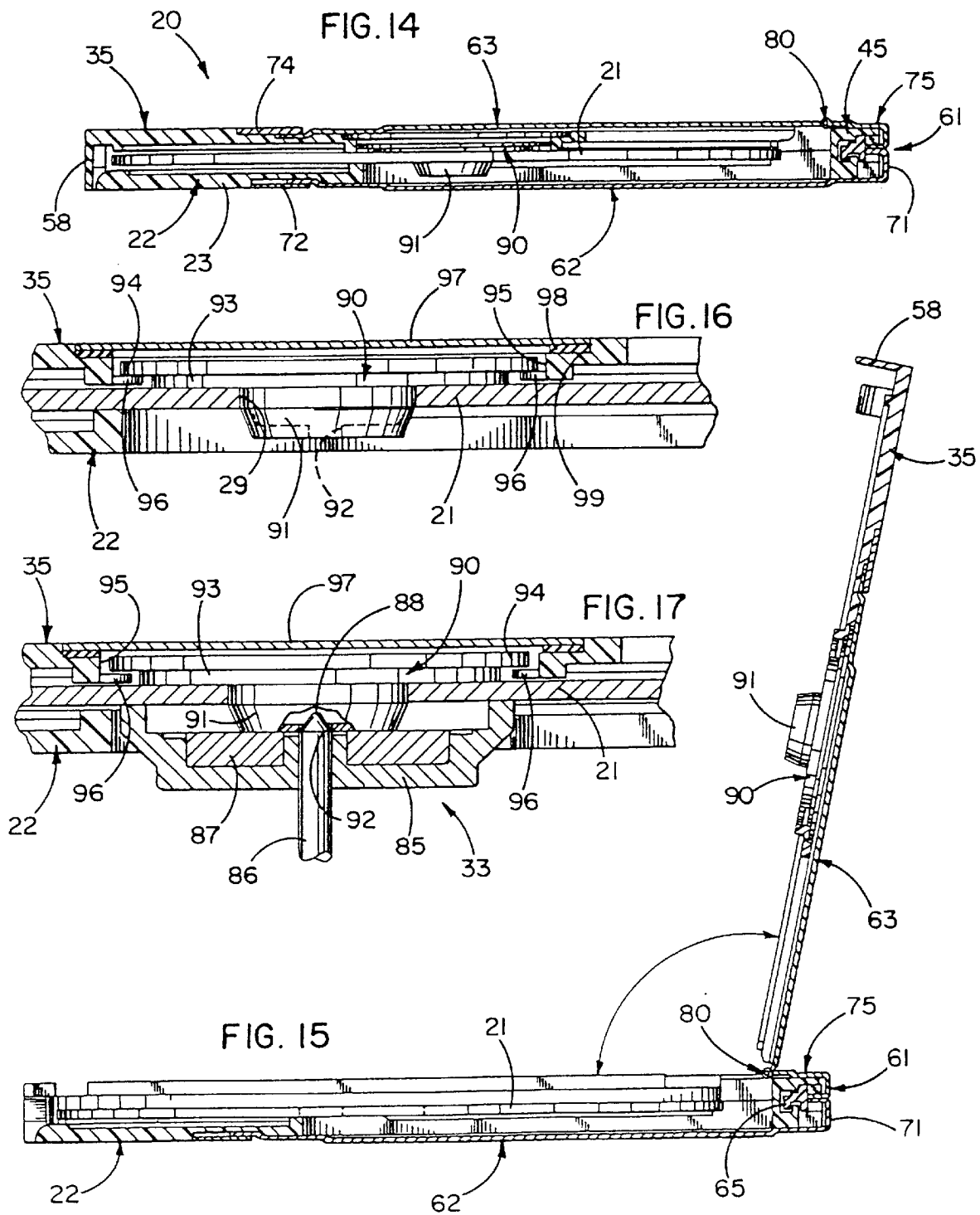

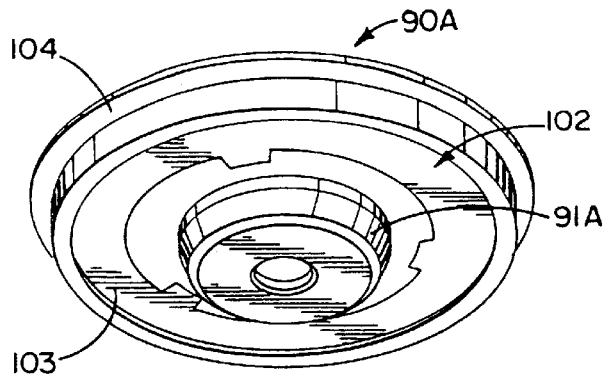
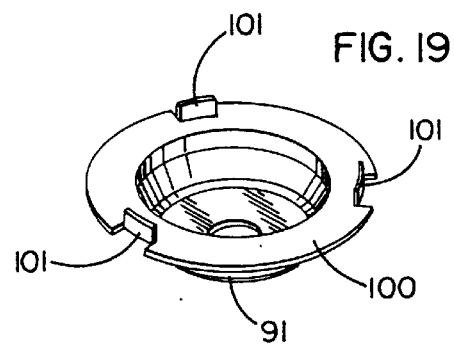
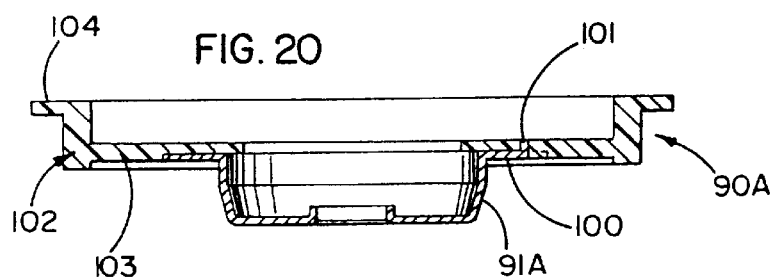
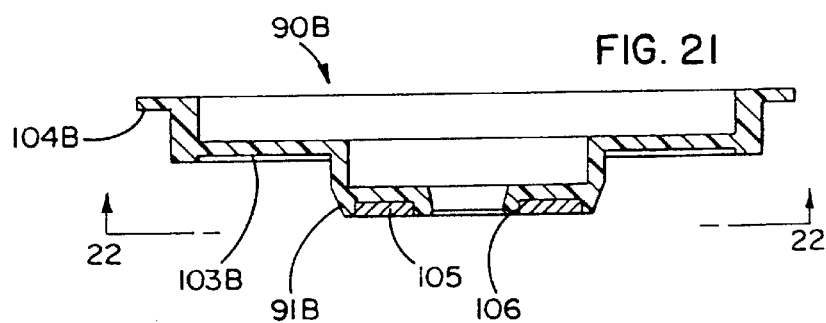
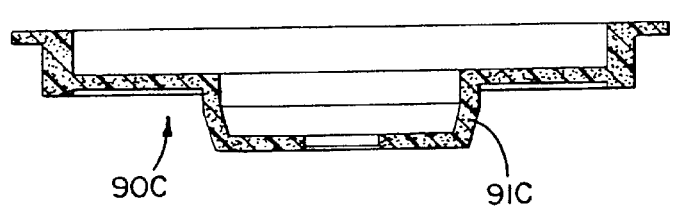
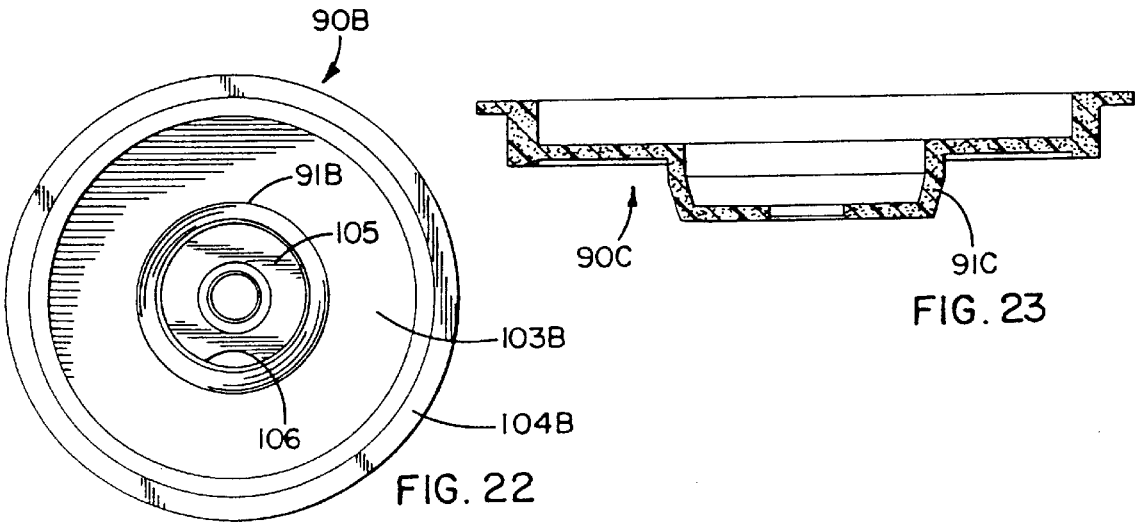

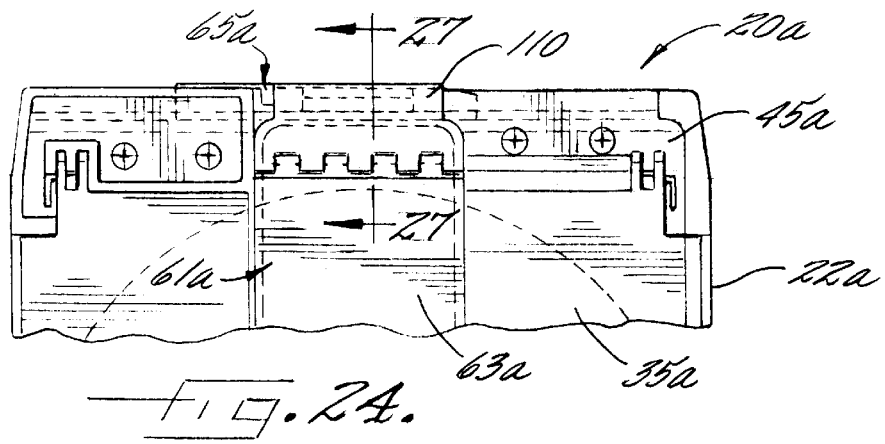
FIG. 24.
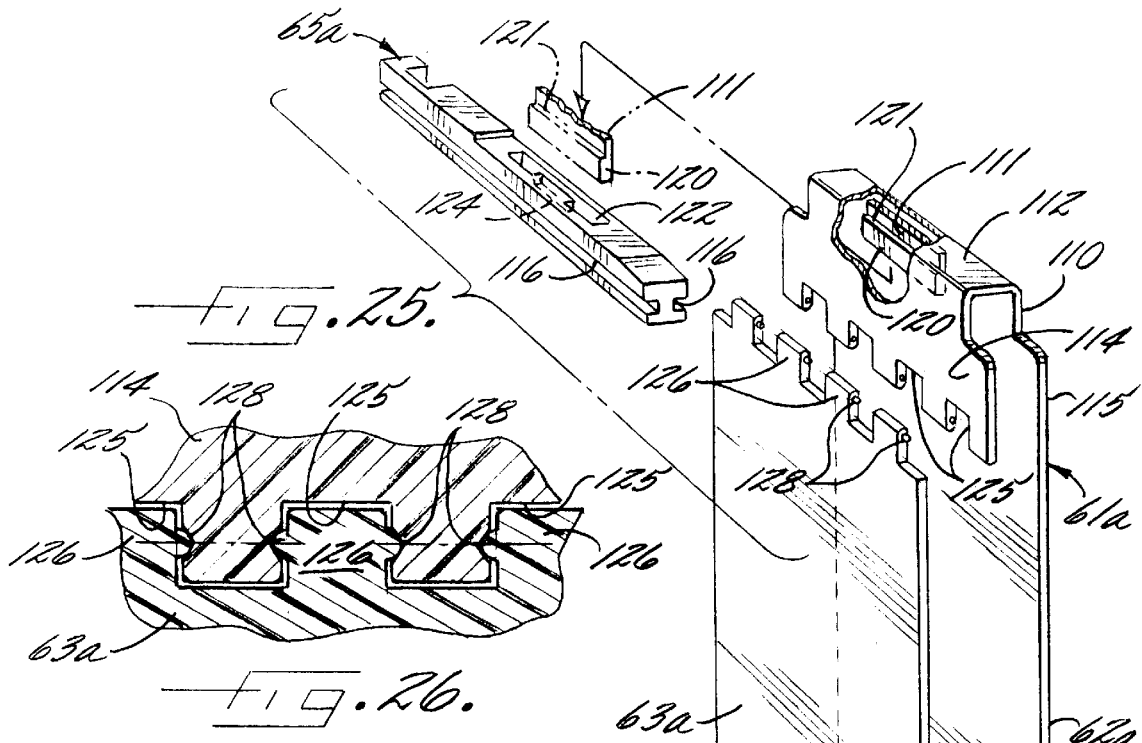
FIG. 25.
FIG. 26.
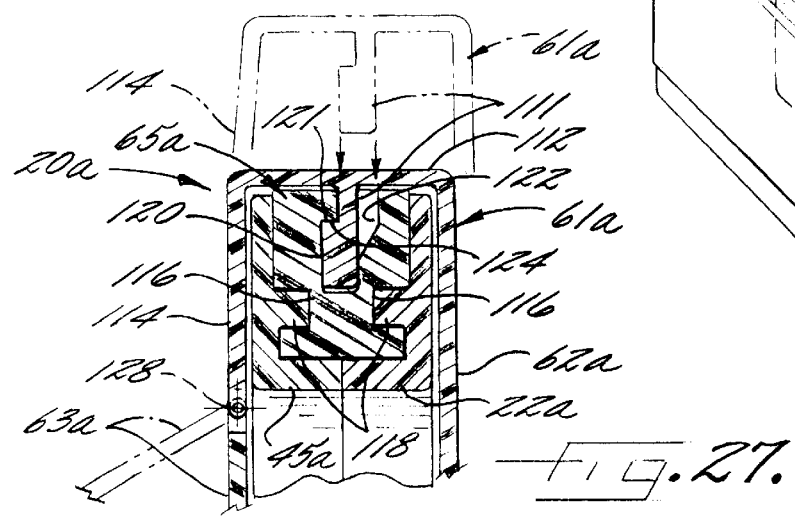
FIG. 27.

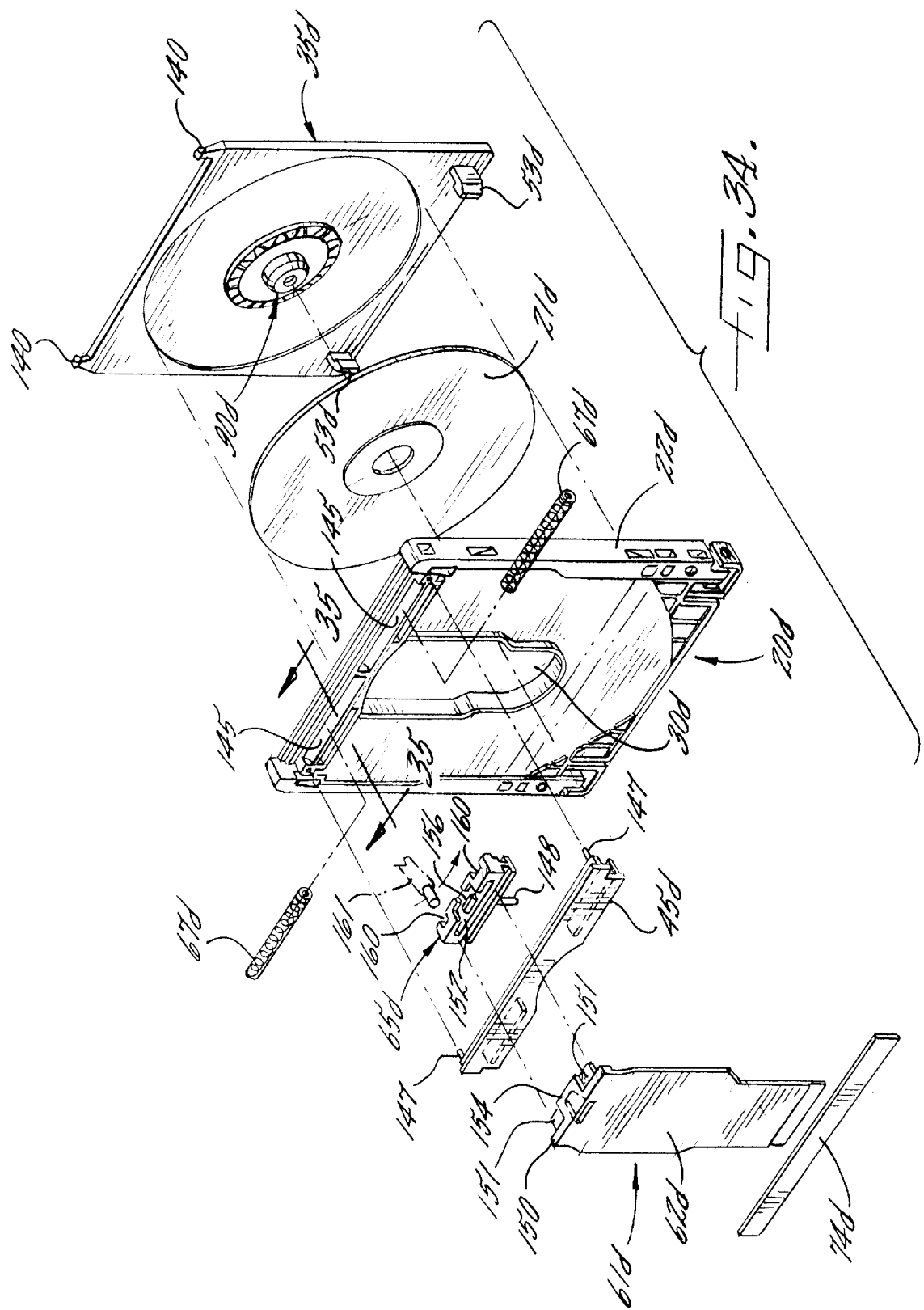

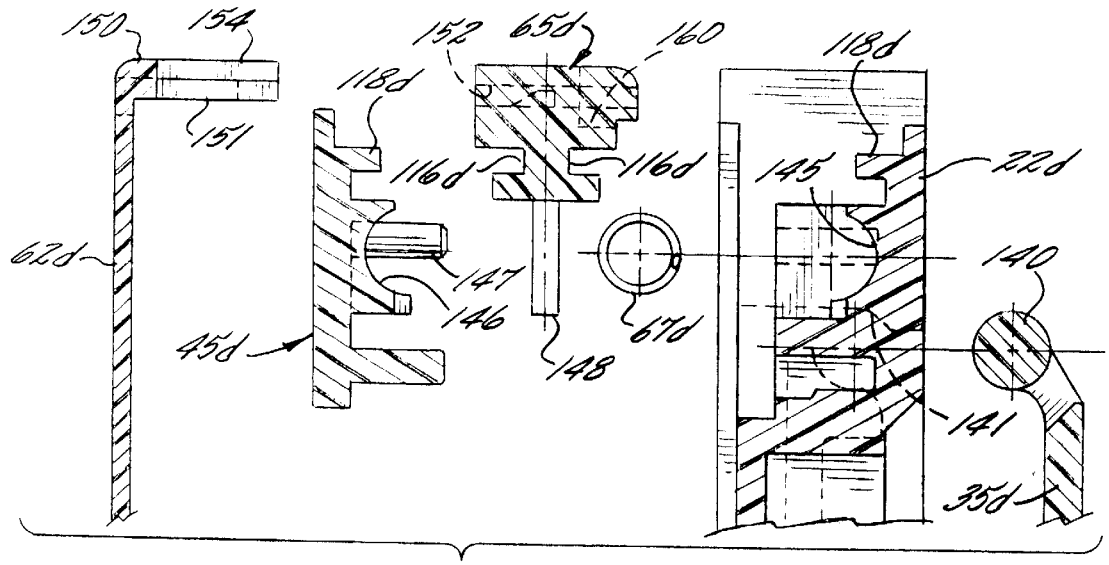
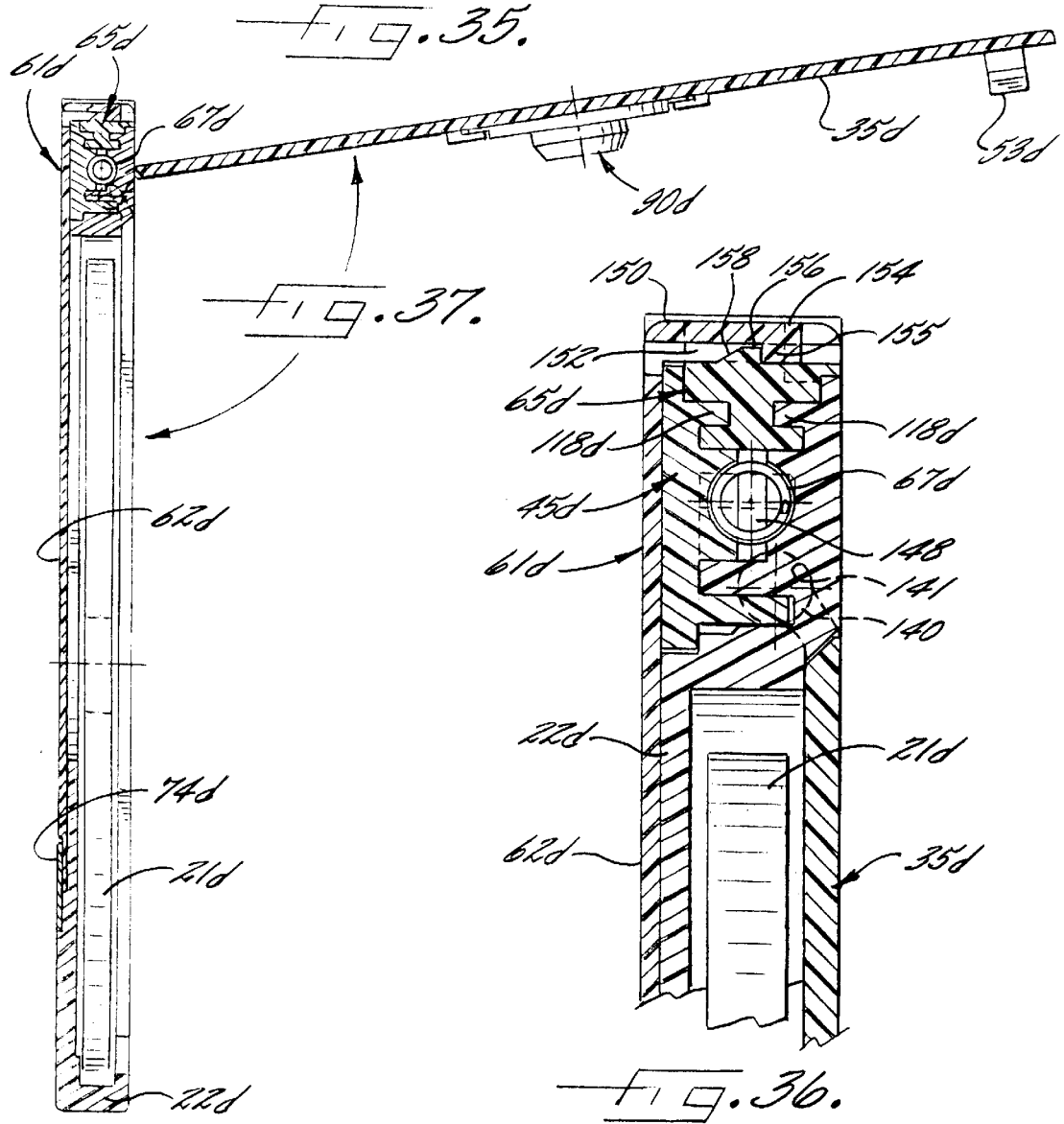

PROTECTIVE CARTRIDGE FOR REWRITABLE OPTICAL DISK

This is a continuation of application Ser. No. 08/643,001 filed on May 3, 1996, ABN which is a c-i-p of Ser. No. 08/505,370 filed Jul. 21, 1995, ABN which is a continuation of Ser. No. 08/210,872 filed Mar. 18, 1994 ABN.

BACKGROUND OF THE INVENTION

The present invention relates generally to cartridges for data information disks. The invention relates more particularly to cartridges for protecting rewritable optical disks used for mass storage of alphanumeric data which may be accessed by a computer. Such a disk is preferably enclosed within a cartridge to prevent the disk from being scratched or nicked during handling. In use, the cartridge containing the disk is inserted into a disk drive having an optical reader/writer and thereafter a sliding door on the cartridge is opened to expose portions of the disk to the reader/writer.

A cartridge of this general type is disclosed in Sandell et al U.S. Pat. No. 4,908,817. The cartridge of that patent comprises a pair of interlocking shells which define a compartment containing the disk. The sliding door is generally U-shaped and is formed in part by a pair of shutters which normally close access apertures formed in opposite sides of the cartridge. When the door is slid open, the shutters open the access apertures. Upon opening of the apertures, one side of the disk is exposed to a rotary drive spindle of the disk drive and to a laser for reading and writing data on the disk. The other side of the disk is exposed to a magnetic head for erasing data from the disk.

The Sandell et al cartridge is disadvantageous in that, for all practical purposes, the disk becomes a permanent part of the cartridge and cannot be easily removed from the cartridge and replaced with another disk. The shutters also commonly are made of metal, which is susceptible to scratching and necessitates costly stamping and cleaning during manufacture. Suzuki et al U.S. Pat. No. 4,746,013 discloses a cartridge with a hinged cover which may be opened to permit removal and replacement of a compact disc. That cartridge, however, is adapted for use only with a read-only memory (ROM) compact disc and cannot be used with an erasable or rewritable optical disk since the hinged cover does not include a shuttered aperture capable of providing access to an erasing head.

When the disk contains alphanumeric data, it is necessary that the disk rotate precisely about a predetermined axis in order to maintain a precise relationship between the disk and the read/write laser. In the cartridge of the Sandell et al patent, apertured metal hubs are glued to opposite sides of the disk and coact with the spindle and the magnetic pulley assembly of the disk drive to cause the disk to rotate precisely and concentrically about the axis of the spindle with virtually no run-out. It is tedious, time-consuming and expensive, however, to affix the hubs to the disk. Moreover, the hubs must be assembled to the disk with great positional accuracy and, in many cases, this is not achieved in mass assembly procedures and thus a relatively large number of disks must be scrapped.

SUMMARY OF THE INVENTION

An important object of the present invention is to provide a protective cartridge which is capable of being easily used with different optical disks and which also is capable of permitting erasure and rewriting of the disks.

A more detailed object is to achieve the foregoing by providing a cartridge having a hinged cover which may be opened to permit removal and replacement of the disk, the cover being equipped with a slidable door having a shutter which also is hinged so as to be capable of swinging with the cover when the latter is opened.

Another important object of the invention is to provide a cartridge which facilitates the use of less expensive optical disks.

A related object is to provide a cartridge which eliminates the need of affixing permanent hubs to each disk.

A more specific object is to eliminate the permanent hubs on the disk by providing the hinged cover of the cartridge with a floating hub which coacts with the disk drive to effect rotation of the disk about a precisely predetermined axis.

Still another object of the invention is to provide a cartridge which is constructed to permit easy lifting of the disk from the cartridge without touching and damaging the data-containing portion of the disk.

The invention also resides in the relatively simple and inexpensive construction of the floating hub for accurately axially aligning the disk during use with the cartridge.

Yet another object is to provide a cartridge having a plastic shutter which is adapted for economical manufacture and assembly and is less susceptible to scratching during handling and usage. A related object is to provide a cartridge with a plastic slider that is adopted for easy snap action engagement with a plastic slider during assembly.

These and other objects and advantages of the invention will become more apparent from the following detailed description when taken in conjunction with the accompanying drawings.

BRIEF DESCRIPTION OF THE DRAWINGS

FIG. 4 is a top plan view of the cartridge and shows the sliding door of the cartridge in a closed position;

FIG. 5 is a view similar to FIG. 4 but shows the door in an open position;

FIG. 14 is an enlarged fragmentary cross-section taken substantially along the line 14—14 of FIG. 4 and shows the cover in a closed position;

FIG. 15 is a view similar to FIG. 14 but shows the cover in an open position;

FIG. 16 is an enlarged fragmentary cross-section taken substantially along the line 16—16 of FIG. 5;

FIG. 17 is a view similar to FIG. 16 but shows the cartridge fully inserted into the disk drive;

FIG. 18 is a perspective view of a modified hub assembly;

FIG. 19 is a perspective view of the hub of the assembly shown in FIG. 18;

FIG. 20 is an enlarged cross-section taken axially through the hub assembly of FIG. 18;

FIG. 21 is a cross-sectional view taken axially through yet another version of a hub assembly;

FIG. 22 is a bottom plan view of the hub assembly shown in FIG. 21;

FIG. 23 is a cross-sectional view taken axially through a unitary hub;

FIG. 24 is a partial side elevational view of an alternative embodiment of the cartridge in accordance with the invention;

FIG. 25 is an enlarged exploded perspective view of the door of the cartridge shown in FIG. 24;

FIG. 26 is an enlarged fragmentary section of the hinge for the pivotal shutter cartridge door shown in FIG. 25;

FIG. 27 is an enlarged fragmentary vertical section taken in the plane of line 27—27 in FIG. 24;

FIG. 34 is an exploded view of still another alternative embodiment of cartridge in accordance with the invention;

FIG. 35 is an enlarged exploded, fragmentary section, of the component parts of the cartridge shown in FIG. 34, taken in the plane of line 35—35 in FIG. 34;

FIG. 36 is an enlarged fragmentary vertical section of the assembled cartridge shown in FIG. 34;

FIG. 37 is a vertical section of the cartridge shown in FIG. 34, with the cover thereof shown in an open condition;

Figure 1:
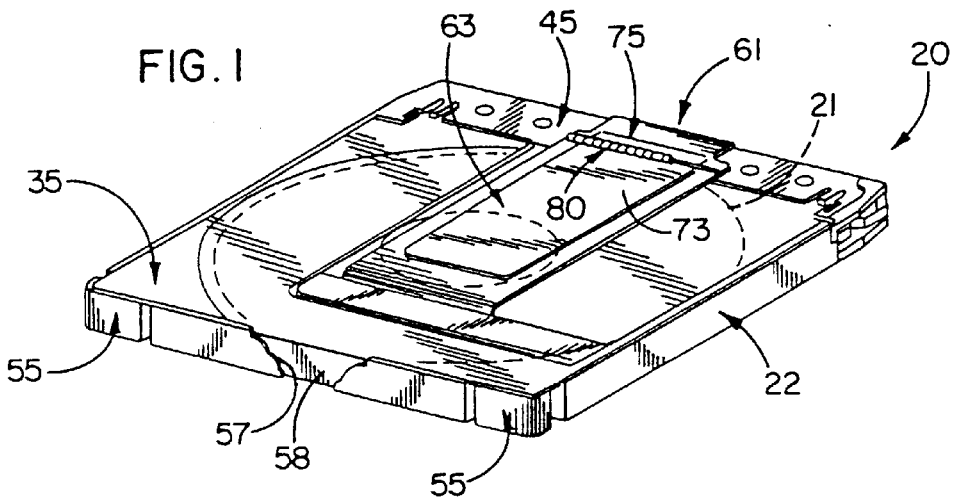
FIG. 1 is a perspective view of a new and improved protective cartridge incorporating the unique features of the present invention, the cover of the cartridge being shown in a closed position.

While the invention is susceptible of various modifications and alternative constructions, certain illustrated embodiments hereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention.

DETAILED DESCRIPTION OF THE PREFERRED EMBODIMENTS

For purposes of illustration, the invention has been shown in the drawings as embodied in a protective cartridge 20 for a rewritable optical disk 21. In some respects, the cartridge is similar to that of Sandell U.S. Pat. No. 4,908,817, the disclosure of which is incorporated herein by reference.

The cartridge 20 is especially adapted for use with a disk 21 having alphanumeric data recorded on one side thereof, the data herein being on the lower side of the disk. Such a disk is considered defective if any portion of the data encoded thereon cannot be faithfully reproduced. Accordingly, it has been recognized that for storing alphanumeric data on optical disks, the disk should be contained within a protective cartridge to prevent the disk from become scratched or pitted during handling.

Figure 2:
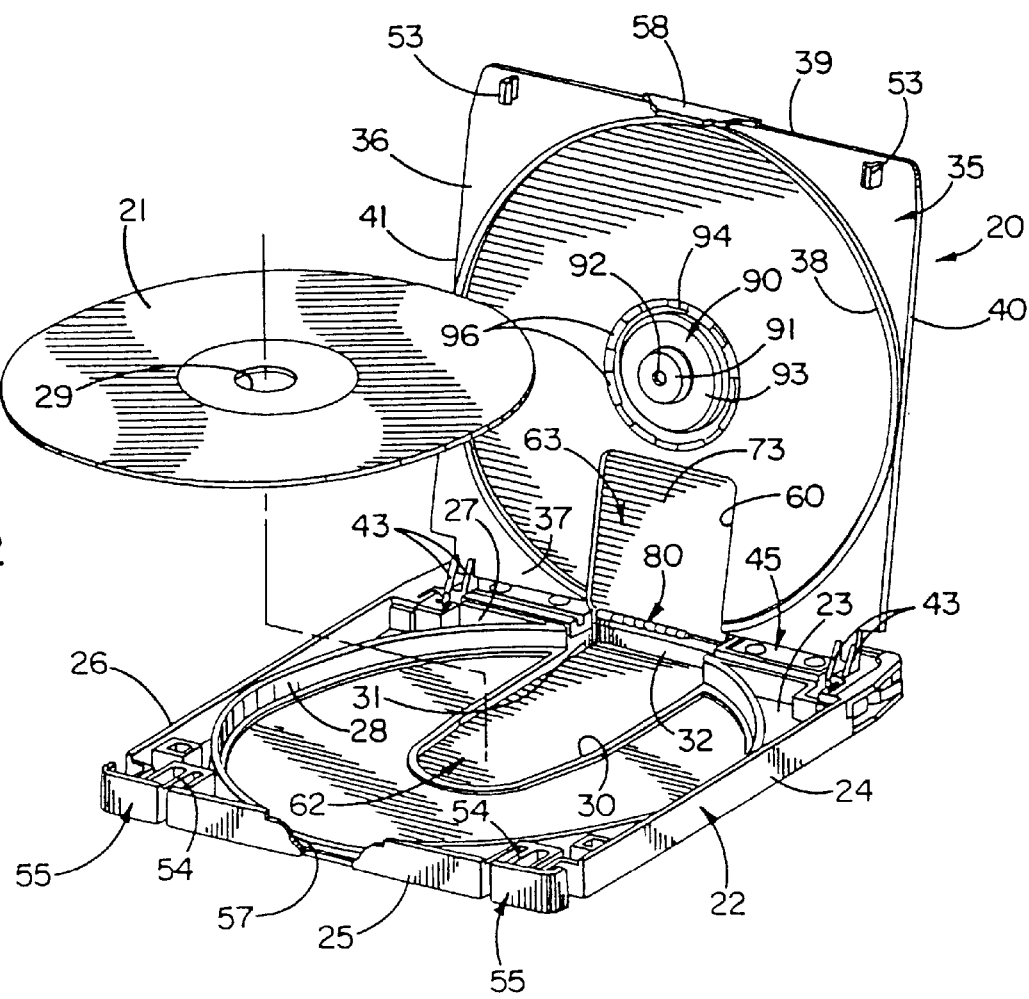
FIG. 2 is a view similar to FIG. 1 but shows the cover in an open position and shows an optical data information disk in exploded relation with the cartridge.

The present cartridge 20 includes a single-piece base 22 which is injection molded from transparent plastic enabling the disk 21 to be seen and identified through the base. The base is generally rectangular in shape and includes a bottom wall 23 (FIG. 2) and upstanding side walls 24, 25 and 26 extending along three of the margins of the bottom wall. A fourth upstanding side wall 27 is located adjacent the rear of the base but is spaced somewhat forwardly of the rear margin of the bottom wall. A generally circular wall or rib 28 is formed integrally with and extends upwardly from the bottom wall 23, is located inwardly of the side walls 24–27, and defines a pocket for the disk, the latter herein being a 4½" disk having approximately a 15 mm. hole 29 through the center thereof. Portions of the rib 28 are substantially tangent to portions of the side walls 24–27.

For a purpose to be explained subsequently, an access aperture 30 (FIGS. 2 and 3) is formed through the bottom wall 23 of the base 22. Herein, the access aperture is generally U-shaped and extends in a fore-and-aft direction along the bottom wall 23 from a point somewhat beyond the center of that wall, past a notch 31 in the side wall 27, and to another upstanding wall 32 spaced rearwardly from the wall 27. The access aperture 30 is adapted to be selectively opened and closed and, when open, exposes the lower side of the disk 21 to a rotary disk drive 33 (FIG. 17) and also to a laser head (not shown) for recording data on and reading data from the lower side of the disk.

In accordance with one aspect of the present invention, an apertured cover 35 is pivotally mounted on the base 22 to swing between open and closed positions and is uniquely constructed to expose the disk 21 to a magnetic head (not shown) for erasing data from the disk. By virtue of the swinging cover, the disk may be easily removed from the cartridge 20 and replaced with a different disk and, in addition, the disk may be erased and rewritten as a result of the cover being apertured and capable of exposing the disk to the erasing head.

Figure 10:
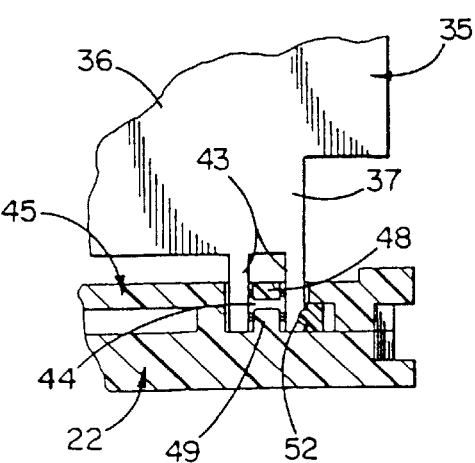
FIG. 10 is a view similar to FIG. 9 but shows the cover in an open position.
Figure 11:
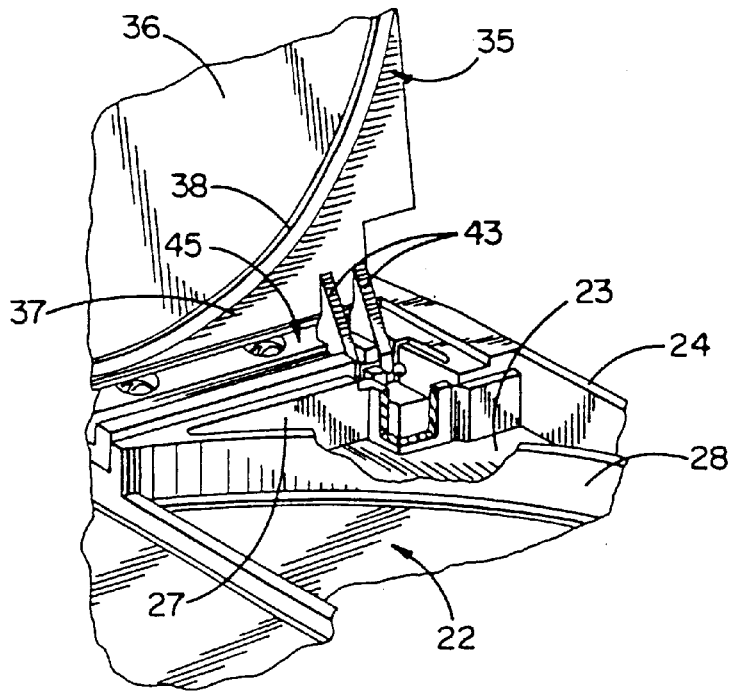
FIG. 11 is an enlarged fragmentary perspective view showing the cover in an open position.

More specifically, the cover 35 includes a generally rectangular plate 36 injection molded from transparent plastic and having a tongue-like mounting portion 37 (FIG. 10) near its rear margin. A circular rib 38 (FIG. 2) depends from the underside of the plate 36 and, when the cover 35 is closed, fits closely inside of the rib 28 of the base 22 to help define the pocket for the disk 21. When the cover is closed, the front or free edge 39 and the side edges 40 and 41 of the plate lie just inside of the walls 25, 24, and 26, respectively, while the top of the plate is substantially flush with the upper edges of such walls. Thus, the walls 24, 25 and 26 of the base 22 rather than the plate 36 dictate the outside configuration of the cartridge 20 and, since the walls can be easily molded to a controlled size and shape, the cartridge may be freely inserted into and removed from the disk drive.

Hinge means are provided for mounting the cover 35 for upward and downward swinging on the base 22 about a laterally extending axis between the closed and open positions of the cover. In this particular instance, the hinge means are defined in part by laterally spaced pairs of laterally spaced ears 43 (FIGS. 2 and 8–11), there being one pair of ears formed integrally with and projecting rearwardly from the mounting tongue 37 adjacent each end thereof. Near their free ends, the ears of each pair are bridged by a laterally extending cylindrical pin 44 (FIGS. 9 and 10) which is integral with the ears. The hinge axis of the cover 35 lies substantially along a line extending through the two hinge pins and is located substantially in the plane of the plate 36.

Figure 3:
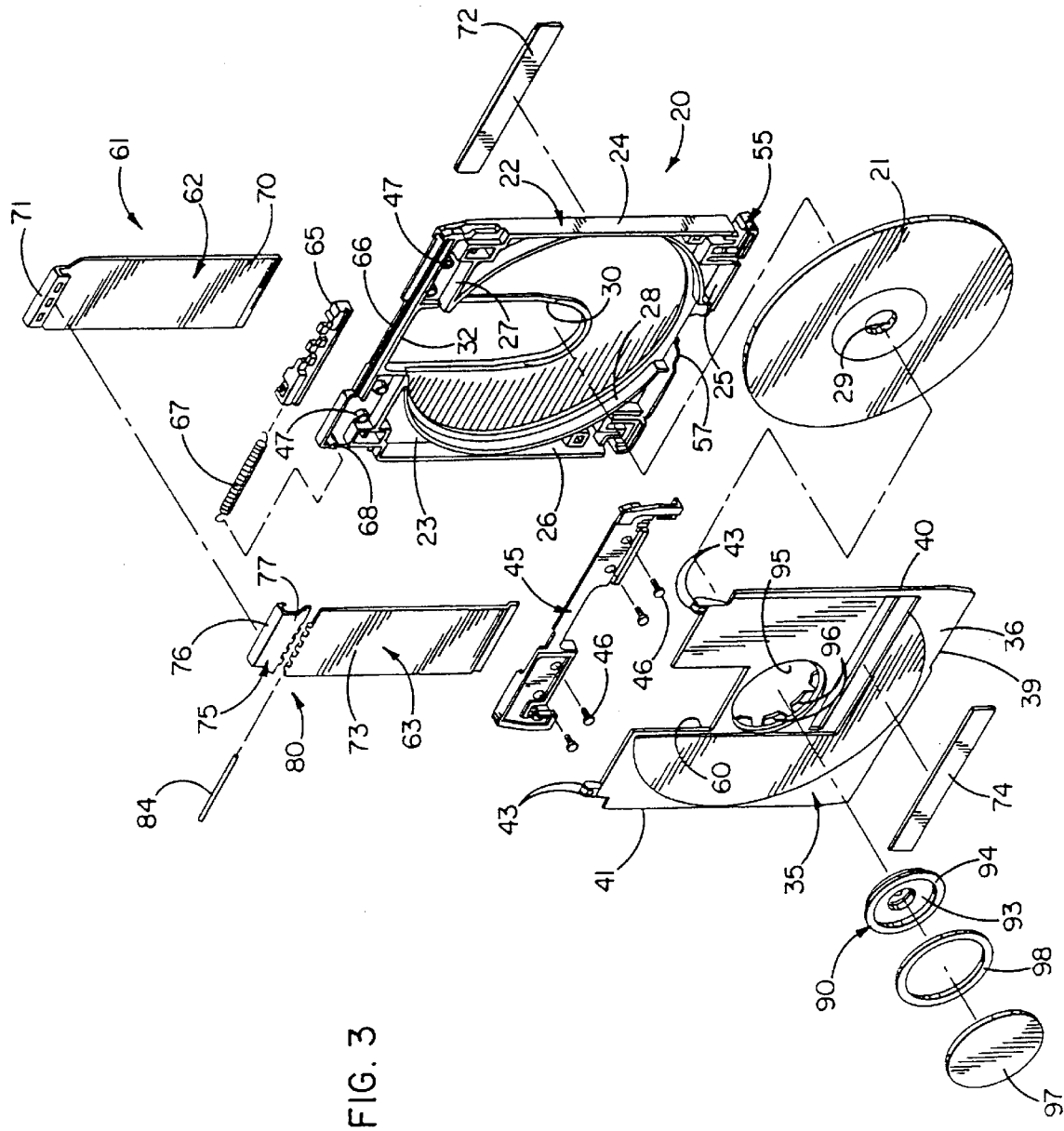
FIG. 3 is an exploded perspective view of the cartridge and the disk.

Overlying the rear marginal portion of the bottom wall 23 of the base 22 is a separately molded and laterally extending plastic strip 45 (FIG. 3). The latter is secured to the base 22 by four screws 46 which are threaded into bosses 47 projecting upwardly from the bottom wall 23 of the base. The bosses support the strip 45 in vertically spaced relation from the bottom wall 23 with the strip being located between the upstanding walls 27 and 32.

Each end portion of the strip 45 is formed with a finger 48 (FIGS. 8–10) which projects forwardly between the ears 43 on the adjacent end portion of the cover 35 and overlies the hinge pin 44 that spans such ears so as to captivate the pin against upward movement. A tab 49 is formed integrally with and projects upwardly from the bottom wall 23 and extends between each pair of ears at the forward side of the hinge pin in order to captivate the pin against forward movement.

With the foregoing arrangement, the cover 35 is assembled with the base 22 by placing the cover flat on the base with the hinge pins 44 located just rearwardly of the tabs 49. The strip 45 then is attached to the base 22 by the screws 46 to cause the fingers 48 to overlie the hinge pins 44. Engagement of the rear ends of the ears 43 with notches 50 (FIG. 8) formed in the strip 45 on opposite sides of each finger 48 limit rearward movement of the hinge pins. Thus, the hinge pins are captivated against bodily movement relative to the base 22 but may pivot on the base to enable the cover 35 to swing between its closed and open positions.

Figure 9:
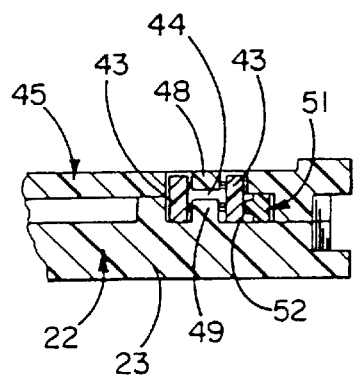
FIG. 9 is an enlarged fragmentary cross-section taken substantially along the line 9—9 of FIG. 8 and shows the cover in a closed position.

Means are provided for releasably holding the cover 35 in an upright open position in order to facilitate insertion of the disk 21 into and removal of the disk from the base 22. In this instance, such means comprise resiliently yieldable and cantilevered fingers 51 (FIGS. 8–10) molded integrally with the plastic strip 45 adjacent the outboard ear 43 of each pair of ears, each finger having a latching nib 52 on its free end. When the cover 35 is in its closed position as shown in FIG. 9, each nib 52 resiliently engages the outboard side of the adjacent outboard ear 43. As the cover approaches its open position, each nib snaps to a latched position located in engagement with the forward side of the outboard ear (see FIG. 10) and thus releasably holds the cover upright to facilitate replacement of the disk. As the cover is manually swung downwardly, the ear cams against the nib to flex the cantilevered finger 51 outwardly and thereby release the nib from latching engagement with the ear in order to permit closing of the cover.

Figure 6:
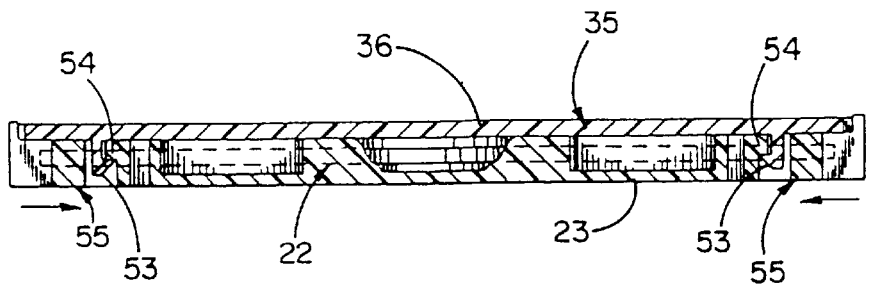
FIG. 6 is an enlarged fragmentary cross-section taken substantially along the line 6—6 of FIG. 4 and shows the cover in a latched condition.
Figure 7:
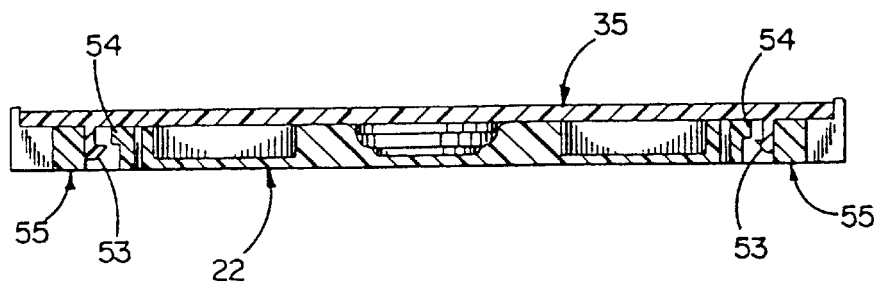
FIG. 7 is a view similar to FIG. 6 but shows the cover in an unlatched condition.
Figure 8:
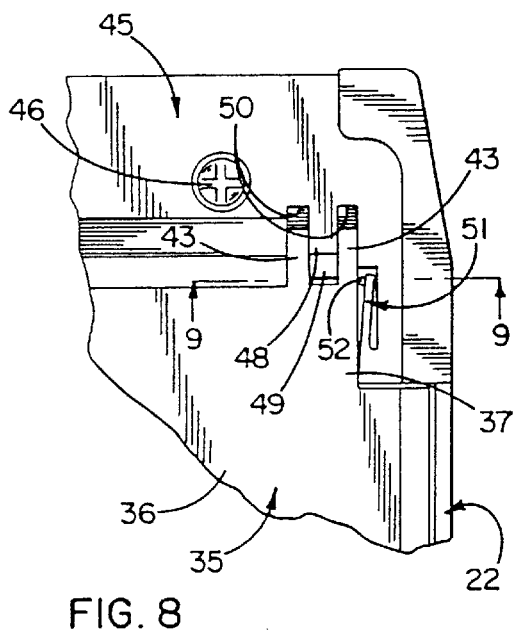
FIG. 8 is an enlarged view of certain components shown in FIG. 4.

The cover 35 is releasably held in its closed position by a pair of laterally spaced latches 53 (FIGS. 2, 6 and 7) molded integrally with and depending from the underside of the cover near the free edge 39 thereof. When the cover is closed, each latch hooks beneath a ledge 54 which forms part of a finger tab unit 55. Each finger tab unit is integral with the base 22 near a forward corner thereof and is resiliently cantilevered so as to be capable of flexing laterally relative to the base. When the cover 35 is in its closed position, each finger tab unit 55 is in a relaxed state and, under such conditions, the latch 53 hooks beneath the ledge 54 as shown in FIG. 6. By squeezing the two finger tab units 55 between the thumb and finger of one hand, the tab units are flexed inwardly to move the ledges 54 inwardly from beneath the latches 53 as shown in FIG. 7 and thereby permit opening of the cover 35. As the cover is swung closed, the latches engage the ledges and momentarily cam the finger units outwardly to allow the latches to pass by the ledges, after which the finger units spring inwardly to cause the ledges to move into hooking engagement with the latches.

Advantageously, provision is made to enable the disk 21 to be easily lifted out of the base 22 without touching the data-containing portion of the disk. To this end, a generally V-shaped notch 57 (FIG. 2) is formed in the center portion of the wall 25 of the base 22 and in the adjacent portion of the circular rib 28. The notch defines an opening into which a thumb may be inserted for purposes of placing the thumb into engagement with the outer peripheral edge of the disk. By placing a forefinger in the hole 29 of the disk, the disk may be lifted out of the base without touching the data-containing portion of the disk.

When the cover 35 is in its closed position, the notch 57 is closed off in order to prevent dirt and other contamination from entering the cartridge 20. For this purpose, a generally V-shaped shield 58 (FIGS. 1 and 2) is formed integrally with and depends from the central portion of the free edge 39 of the cover. When the cover is closed, the shield 58 slips into that portion of the notch 57 formed in the wall 25 of the base 22 and closes off the notch to protect against entry of dirt and the like. The outer side of the shield 58 is substantially flush with the outer side of the wall 25 when the cover is in its closed position.

In carrying out the invention, an access aperture 60 (FIGS. 2, 3 and 5) is formed through the swingable cover 35 in order to enable the disk 21 to be exposed to the magnetic head for erasing data from the disk. As shown most clearly in FIG. 3, the access aperture 60 is generally rectangular and extends forwardly from the central portion of the rear edge of the cover to a location somewhat short of the center of the cover.

Further in keeping with the invention, the access apertures 30 and 60 are adapted to be selectively opened and closed by a slidable door 61 having shutters 62 and 63 (FIG. 3) which, when the door is closed, cover the access apertures 30 and 60, respectively. The door 61 is particularly characterized in that the shutter 63 not only is capable of sliding relative to the cover 35 between open and closed positions of the door but also is capable of swinging with the cover when the latter is opened for purposes of replacing the disk 21.

Figure 12:
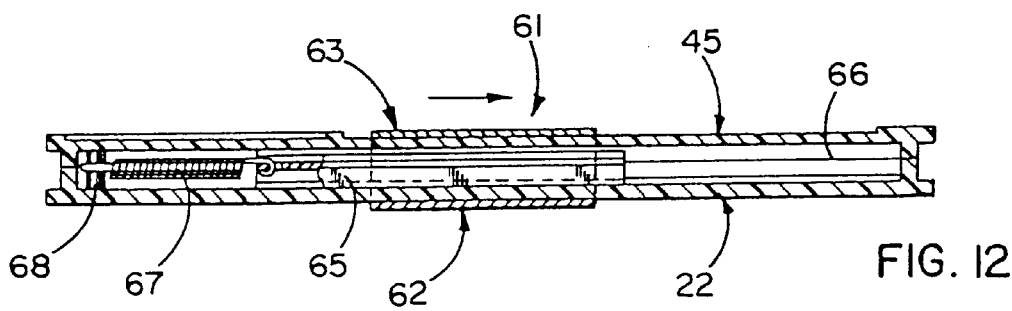
FIG. 12 is an enlarged cross-section taken substantially along the line 12—12 of FIG. 4.
Figure 13:
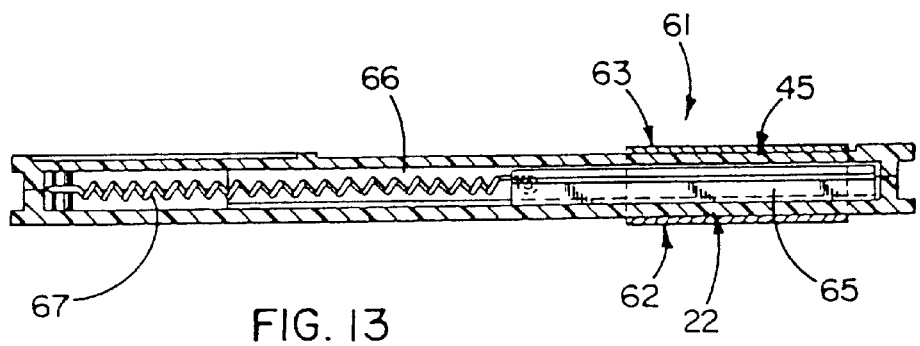
FIG. 13 is an enlarged fragmentary cross-section taken substantially along the line 13—13 of FIG. 5.

More specifically, the door 61 includes a mounting portion which includes a slider 65 in the form of an elongated plastic member (FIG. 3) which is guided for lateral movement in a channel-like track 66 at the rear end of the cartridge 20. The track is defined between the upper side of the bottom wall 23 of the base 22 and the lower side of the plastic strip 45. The slider 65 for the door 61 is essentially the same as disclosed in the aforementioned Sandell et al patent and need not be described in detail. It will suffice to say that the slider is guided in the track to slide laterally between a door-closed position shown in FIG. 12 and a door-open position shown in FIG. 13. A contractile spring 67 is connected between one end of the slider and a fixed pin 68 adjacent one end of the track and acts to urge the slider toward its door-closed position.

The shutter 62 of the door 61 also is essentially the same as disclosed in the Sandell et al patent and is defined by a generally rectangular plate 70 (FIG. 3) of sheet metal (e.g., stainless steel) located in underlying relation with the bottom wall 23 of the base 22. The rear edge of the shutter 62 is formed with a channel-like mounting portion 71 which is attached rigidly to the slider 65 in the manner disclosed in the Sandell et al patent. In order to guide the forward edge portion of the shutter and to prevent such edge portion from being bent away from the base 22, a sheet metal retainer strip 72 (FIGS. 3 and 14) overlaps the forward edge portion of the shutter and is cemented to ledges formed in the lower side of the base.

The shutter 63 for the upper aperture 60 also includes a generally rectangular stainless steel plate 73 (FIG. 3) which overlies the upper side of the plate 36 of the cover 35 and whose lower edge portion is slidably guided by a retainer strip 74 secured to the plate 36. The plate 73 of the shutter 63, however, is not attached directly to the plastic slider 65 but instead is attached (in a manner to be described subsequently) to a stainless steel mounting member or bracket 75 which, in turn, is attached to the slider and which, for practical purposes, forms part of the slider. The rear of the mounting bracket 75 is formed with a channel-shaped mounting portion 76 which is attached rigidly to the plastic slider 65 in the same manner as the mounting portion 71 of the shutter 62. Formed integrally with and extending forwardly from the mounting portion 76 of the bracket 75 is a tongue 77.

Hinge means 80 connect the rear edge of the plate 73 of the shutter 63 to the forward edge of the tongue 77 of the mounting bracket 75 and support the shutter 63 for swinging upwardly and downwardly with the cover 35 about an axis coinciding substantially with the hinge axis of the cover. In this instance, the hinge 80 is defined by a series of interleaved curls (see FIG. 3) formed along adjacent edges of the shutter plate 73 and the bracket tongue 77. In addition, the hinge includes a cylindrical hinge pin 84 which extends laterally through the curls so as to pivotally connect the shutter 63 to the bracket 75.

Normally, the door 61 is disposed in a closed position (FIGS. 1 and 4) in which the shutters 62 and 63 cover the access apertures 30 and 60, respectively, to protect the disk 21 against contamination. When the cartridge 20 is inserted into the disk drive 33, a pivoted actuator arm (not shown) engages the slider 65 and moves the latter to the position shown in FIG. 13 in order to open both shutters simultaneously and thereby expose the access apertures 30 and 60 (see FIG. 5). As explained above, the open aperture 30 exposes the disk 21 to the read/write head while the open aperture 60 exposes the disk to the erase head. In an overall sense, therefore, the present cartridge 20 functions in the disk drive 33 itself in the same manner as the cartridge of the Sandell et al patent. The present cartridge is particularly advantageous, however, in that the hinged shutter 63 of the sliding door 61 enables the cover 35 to be hinged to the base 22 and swung to an open position facilitating easy replacement of the disk 21.

The disk drive 33 is shown in detail in FIG. 17 and comprises a rotary pulley assembly 85, a spindle 86 which rotates in unison with the pulley assembly and an annular magnet 87 which is adhesively bonded to the pulley assembly. The upper end portion of the spindle is defined by a tapered tip 88.

In accordance with a further aspect of the invention, the cover 35 of the cartridge 20 is equipped with a floating aligner 90 which allows a precisely centered relation to be established between the axis of the disk 21 and the axis of the spindle 86 when the cartridge is inserted into the disk drive 33. By virtue of the aligner 90 being built into the cover 35, the significant expense of gluing or otherwise securing separate alignment hubs to the disk 21 itself is eliminated.

In this particular instance, the aligner 90 includes a steel hub 91 (FIGS. 16 and 17) of circular cross-section and having a downwardly tapered and frusto conical lower end portion and a cylindrical upper end portion. The cylindrical upper end portion of the hub is sized to telescope snugly and precisely into the hole 29 in the disk 21. Formed in the axially facing lower end of the hub 91 is a hole 92 which is sized to snugly and precisely receive the tip 88 of the spindle 86 when the cartridge 20 is inserted into the disk drive 33. Formed integrally with the upper end of the hub 91 is a circular plate 93 whose upper end includes a radially outwardly extending flange 94.

The aligner 90 is adapted to be inserted into an opening 95 (FIGS. 3 and 16) formed through the central portion of the cover 35, the diameter of the opening being substantially greater than the diameter of the flange 94. Formed integrally with and projecting radially inwardly from the lower edge portion of the opening 95 are several (e.g., eight) angularly spaced tabs 96 which underlie the flange 94 and support the aligner 90 vertically when the cartridge 20 is not in the disk drive 33. The diameter of the circle defined by the free edges of the tabs 96 is substantially greater than the diameter of the plate 93 and thus the aligner is free to float radially relative to the cover 35 as permitted by the radial clearance between the plate and the tabs.

The aligner 90 is held in assembled relation with the cover 35 by a sheet metal cap 97 (FIGS. 3 and 16) which is bonded by a ring 98 of double-sided adhesive within an enlarged counterbore 99 formed in the upper side of the cover 35. As is apparent from FIG. 16, the axial spacing between the cap 97 and the tabs 96 is significantly greater than the axial thickness of the flange 94 and thus the aligner 90 also is free to float axially relative to the cover 35.

As the cover 35 is closed, the hub 91 of the aligner 90 telescopes into the hole 29 in the disk 21 and establishes a precisely concentric relationship between the disk and the hub. Prior to insertion of the cartridge into the disk drive 33, the disk rests on the base 22 of the cartridge as shown in FIG. 16 while the flange 94 rests on the tabs 96.

The cartridge 20 is inserted into the disk drive 33 by lowering the cartridge downwardly toward the pulley assembly 85 and the spindle 86. As an incident thereto, the hole 92 in the hub 91 moves into telescoped relation with the spindle 86 and, because the hub is free to float radially, the hub is brought into precise concentricity with the spindle and the pulley assembly 85. As the cartridge is lowered, the disk 21 engages and is stopped by the upper side of the pulley assembly 85 but the base 22 continues to move downwardly through a short distance so as to establish axial running clearance between the disk and the base as shown in FIG. 17. At the same time, the hub 91 engages and is stopped by the magnet 87 and, as the cover 35 continues to move downwardly, axial running clearance is established between the lower side of the flange 94 and the upper sides of the tabs 96. In the fully inserted position of the cartridge 20, the magnet 87 attracts the hub 91 and causes the disk 21 to become clamped between the lower side of the plate 93 and the upper side of the pulley assembly 85.

Accordingly, the radially floatable aligner 90 serves as a means for precisely centering the disk 21 relative to the spindle 86 and for causing the disk to become rigidly clamped to the pulley assembly 85. Because the aligner also is capable of floating axially, axial clearance is established between the disk 21 and the base 22 on the one hand and between the flange 94 and the tabs 96 on the other hand so as to prevent those components from rubbing against one another during rotation of the disk.

In the embodiment of FIGS. 1–17, the aligner 90 has been disclosed as being made of a single piece of metal. Economy of manufacture, however, may be achieved by molding the aligner at least partially out of plastic. By way of example, FIGS. 18–20 show an aligner 90A in which the hub 91A is stamped from sheet metal and includes a radially outwardly projecting flange 100 with upwardly extending and angularly spaced tabs 101. The flange 100 of the hub 91A is insert molded into a plastic carrier 102 having a plate 103 and a flange 104 corresponding generally to the plate 93 and the flange 94, respectively, of the first embodiment. During the molding operation, the tabs 101 become encapsulated by and embedded in the plastic of the plate 103 in order to anchor the hub 91 to the carrier 102.

FIGS. 21 and 22 show an even less costly aligner 90B in which the hub 91B, the plate 103B and the flange 104B are formed by a one-piece unit molded of highly wear-resistant plastic. A ferromagnetic disc 105 having a central aperture 106 is affixed to the lower end of the hub either by insert molding or by adhesively bonding the disc to the hub.

The aligner 90C shown in FIG. 23 is molded entirely from wear-resistant plastic which is impregnated with ferromagnetic particles. Thus, the aligner 90C is a very inexpensive single-piece unit. If higher magnetic properties are required, a disc similar to the disc 105 may be affixed to the lower end of the hub 91C of the aligner 90C.

Referring now to FIGS. 24–27, there is shown a cartridge 20a having an alternative form of door 61a, wherein items similar to those described above have been given similar reference numerals with the distinguishing suffix "a" added. The cartridge 20a has a hinge mounted cover 35a and a door 61a comprising a slider 65a and a pair of shutters 62a, 63a, with the shutter 63a being disposed for relative pivotal movement simultaneously with the cover 35a.

In accordance with a further aspect of the invention, the shutters 62a, 63a and slider 65a both are plastic molded and the shutters 62a, 63a are adapted for easy snap action engagement with the slider during assembly. To this end, the rear shutter 62a has an integrally formed U-shaped mounting portion 110 having a tongue 111 extending inwardly from an end wall 112 of the U-shaped mounting portion 110 at a location midway between front and rear legs 114, 115 thereof. The slider 65a has an elongated block-like configuration formed with grooves 116 in opposite sides within which interior tracks 60 of the strip 45a and base 22a are received for supporting the slider 65a for relative sliding movement.

In order to positively engage the shutters 62a, 63a with the slider 65a, the tongue 111 is formed with a laterally extending locking ledge 120 which defines a right angle locking surface 121. The slider 65a has a slot 122 which opens upwardly, as depicted in FIG. 27, in laterally off centered relation to a top side of the slider. The slot 122 is formed with an undercut on one side thereof which defines a locking ledge 124. The opposite side of the slot 122 is formed with a lower camming wall 125 tapered inwardly toward the undercut locking ledge 124.

To permit snap action engagement of the shutters 62a, 63a with the slider 65a, as depicted in FIG. 27, the legs 114, 115 of U-shaped mounting portion 111 of the door are positioned over the top of the slider 65a in off centered relation such that the tongue 111 is directly over the slot 122 and the forward leg 114 is deflected slightly to accommodate such positioning. The tongue 111 may thereupon be forced into the slot 122 until reaching the camming wall 125 at which time the locking ledge 120 of the tongue is urged to a centrally mounted position (to the left as depicted in FIG. 27), until the locking ledges 121, 124 of the tongue 111 and slider 65a are in inter-engaging relation. It will be appreciated that the shutters 62a, 63a may be snapped into engaging relation with the slider 65a following pre-assembly of the base 22a, cover 35a, strip 45a and the slider 65a as described in connection with the previous embodiment.

In carrying on a further feature of this embodiment of the invention, the shutter 63a has a relatively simple hinge mounting defined by a series of axially aligned ball and socket joints also adapted for snap action engagement. In this instance, the forward leg 114 of the U-shaped door mounting portion 110 is formed with a plurality of axially spaced substantially rectangular slots 125 which each receive a respective one of an outwardly extending series of substantially rectangular extensions 126d of the upper end of the shutter 63a. For enabling pivotal movement of the shutter 63a relative to the leg 114 and snap action assembly therewith, the rectangular extensions 126 in this case each are formed with an axially aligned, outwardly extending rounded nipples or balls 128 on opposite sides thereof which are adapted for snap action engagement with corresponding axially aligned female recesses or sockets formed in opposite sides of the flange recesses 125.

Figures 28, 29:
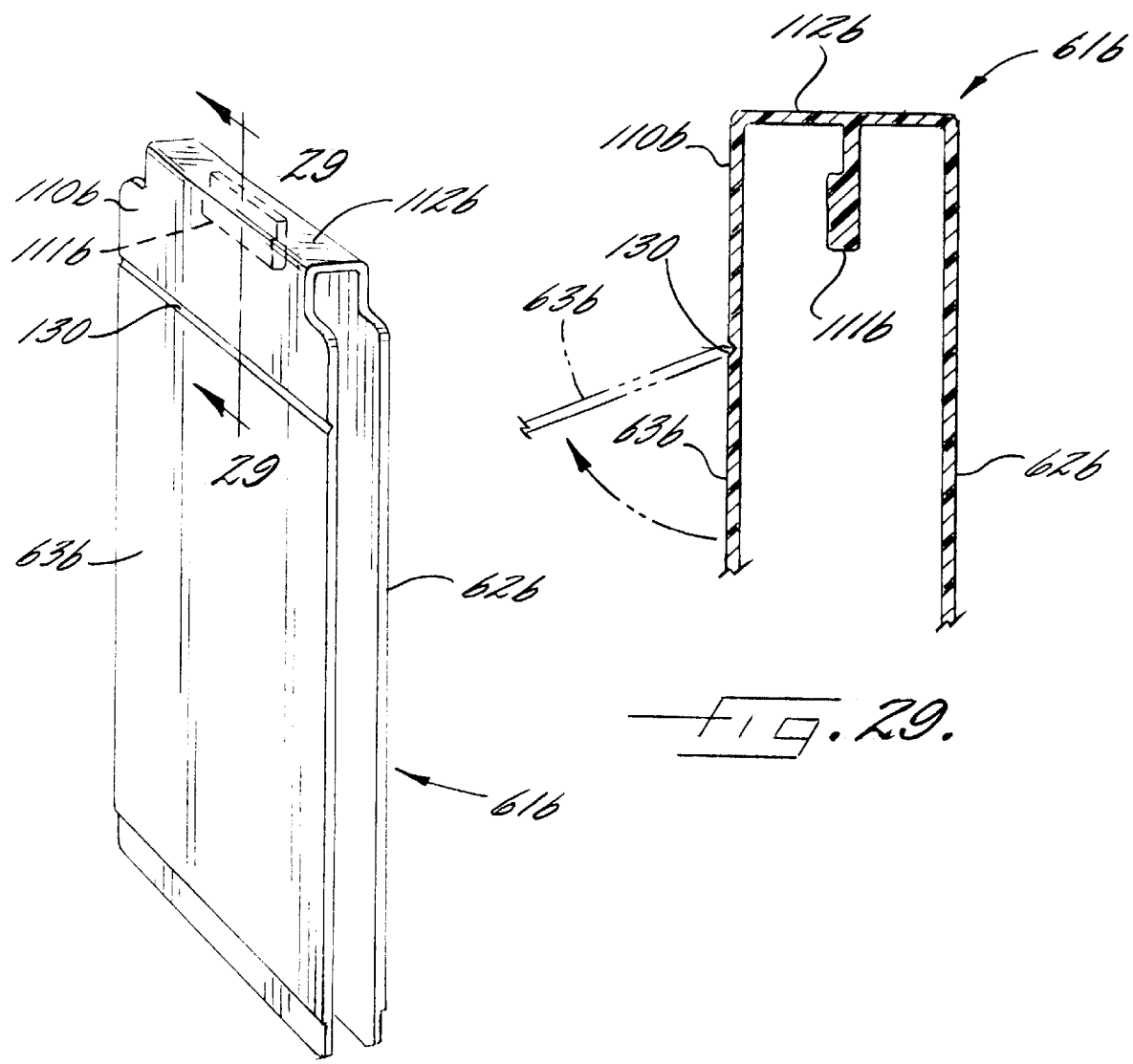
FIG. 28 is an enlarged perspective of an alternative form of door usable with the cartridge shown in FIG. 24.
FIG. 29 is an enlarged fragmentary section of the door shown in FIG. 28 taken in the plane of line 29—29.
Figure 30:
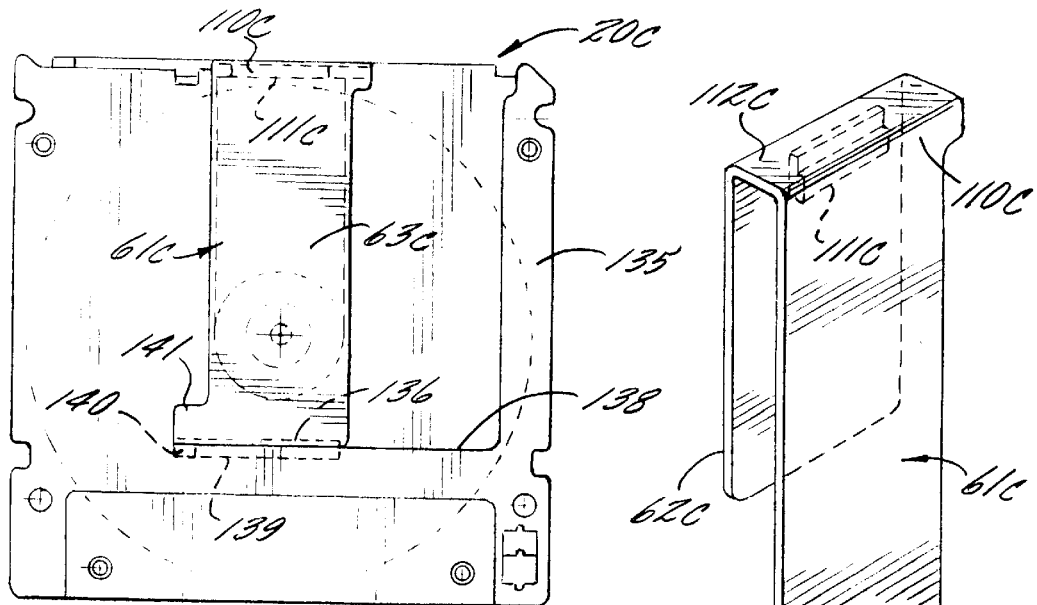
FIG. 30 is a side elevational view of another alternative embodiment of the cartridge in accordance with the invention, showing the door in a closed position
Figure 32:
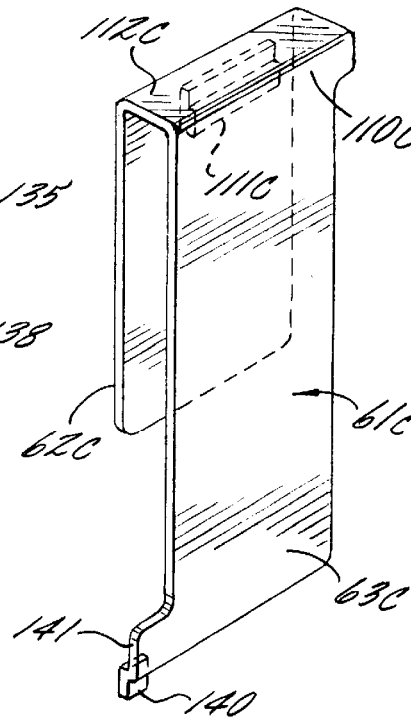
FIG. 32 is an enlarged prospective of the slidable door of the cartridge shown in FIG. 30.
Figure 31:
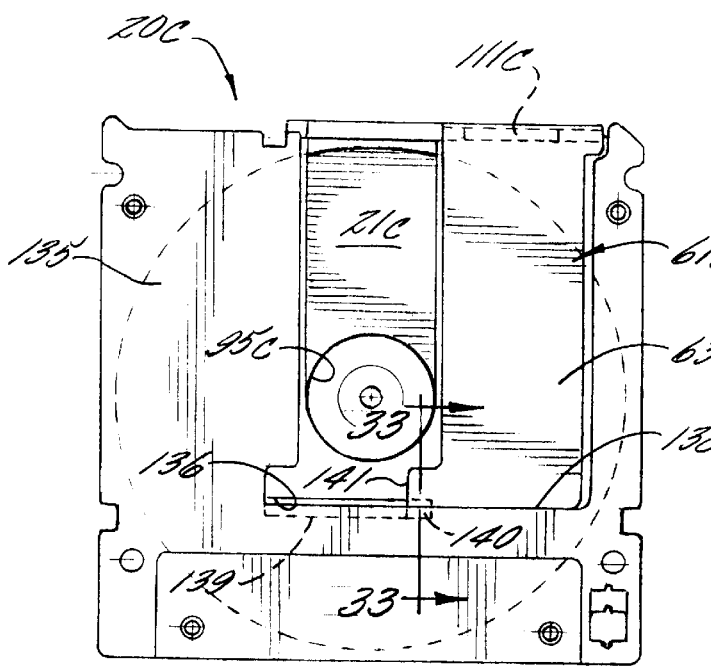
FIG. 31 is a side elevational view, similar to FIG. 30, but showing the door in an open position.
Figure 33:
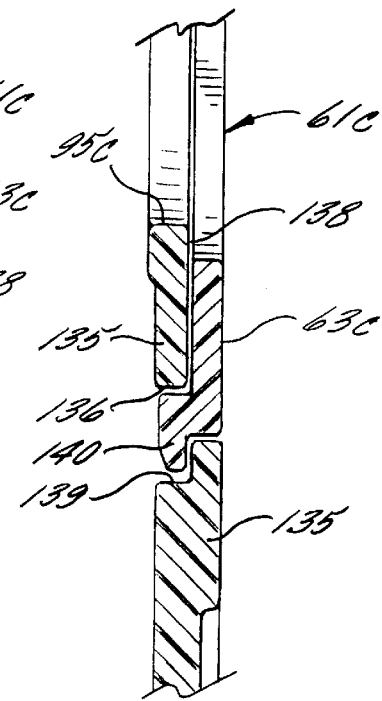
FIG. 33 is an enlarged fragmentary section taken in the plane of line 33—33 in FIG. 31.

An alternative form of the door 61b that can be used with the cartridge 20a is illustrated in FIGS. 28 and 29. The door 61b in this instance is similar to the door 61a, except that the shutter 63b is pivotally mounted on the U-shaped door mounting portion 110b by a living hinge 130 defined by a V-shaped indentation formed in an outer side of the door. Hence, in this embodiment the shutters 62b, 63b and the mounting portion 110b may be economically molded as a single unit. It will be appreciated by one skilled in the art that the one-piece unit may be made of a plastic materials having sufficient resiliency in the narrow thickness portion defined between the apex of the V groove 130 and the rear side of the shutter 63b for permitting pivotal mounting of the shutter 63b relative to the mounting portion 110b.

Referring now to FIGS. 30–33, there is shown another alternative form of cartridge 20c. The cartridge 20c in this instance may be formed by a pair of shells 135 which define a disk-receiving housing or compartment and internal guide tracks for supporting a door carrying slider in a manner similar to the cartridge disclosed in referenced U.S. Pat. No. 4,908,817, which does not include a pivotal cover. The shells 135 in this case define front and rear walls of the cartridge. The door 61c has a one-piece molded plastic construction which includes a U-shaped mounting portion 110c, a forward shutter 63c designed to cover a spindle opening 96d in one side or wall of the cartridge, and a shorter length rear shutter 62c designed for covering a read and write opening in a rear side or wall of the cartridge. The mounting portion 110c includes an inwardly extending tongue 111c for snap action locking engagement with the slider in a manner similar to that described in connection with the embodiment of FIGS. 24–27.

In carrying out a further aspect of the invention, to guide movement of the door 61c between its open and closed positions, the front shell or wall 135 of the cartridge is formed with a transversely extending opening 136 for receiving and guiding a lower end of the shutter 63c during door movement between open and closed positions without the need for a separate retaining step. The forward shell 135 in this case is formed with a forwardly opening recess 138 for receiving the shutter 63c with a forward face thereof in substantial co-planar relation with a front face of the shell 135. The cartridge opening 136 extends through the shell in a transverse direction along the lower end of the recess 138 and communicates with a downwardly extending recess 139 in a rear side of the shell 135.

For guiding movement of the door 61c, the lower end of the shutter 63c is formed with a rearwardly and downwardly extending guide lip 140 which is positionable through the cartridge opening 136 with the lower end of the lip 140 located in and movable along the rear recess 139 of the cartridge shell 135. The guide lip 140 in this instance is provided on a lateral extension 141 of the shutter 63c so as to be laterally offset from the main plate portion of the shutter, the lower perimeter of which substantially closes the opening 136 in the shell so as to prevent dust and particles from entering the cartridge. It will be appreciated that since the guide lip 140 rides within the recess 139 in a rear side of the forward shell 135, the rear face of the guide lip 140 is substantially co-planar with the rear face of the forward shell 135.

Referring now to FIGS. 34–39, there is shown another alternative embodiment of the cartridge in accordance with the present invention, wherein items similar to those described above have been given similar reference numerals with the distinguishing suffix "d" added. The cartridge 20d includes a base 22d having a disk receiving area and an access opening 62d, a hinge mounted cover 35d carrying a disk aligner hub 90d substantially similar to that described previously, a mounting strip 45d, and a door 61d which includes an elongated block-like slider 65d. A hinged cover 35d in this case does not include a rear access aperture, and hence, read and write operations on a contained disk is effected through the base access opening 62d.

For supporting the cover 35d for pivotal movement, the cover 35d is formed with a pair of laterally projecting hinge pins 140 at its mounting end which are captively received for relative pivotal movement within cylindrical chambers 141 formed in the base 22d. The hinge pins 141 are captively retained in the cylindrical chambers 141 by the strip 45d.

In order to support the slider 65d for relative sliding movement, the base 22d and strip 45d again are formed with opposing tracks 60d which are received in respective longitudinal grooves 116d in opposite sides of the slider 65d. The door 65d in this instance is adapted for sliding movement in either direction with respect to the centrally located base access opening 62d. For biasing the door to the central closed position, the base 22d and strip 45d are formed with pairs of opposed semi-cylindrical recesses 145, 146, which together define a pair of co-axial cylindrical chambers each for receiving a respective return spring 67d. The slider 65d is formed with a depending pin 148 adapted to engage and contract a respective one of the springs 67d when moved in an opening direction against the spring.

To assemble the cartridge 20d, the cover hinge pins 140 and the springs 67d are positionable into the respective recesses 141, 145 of the base 22d and the slider 65d positioned onto the tracks 60d of the base. The mounting strip 45d is thereupon assembled on the base 33d for captively retaining the cover hinge pins 140 and the springs 67d in the respective internal cylindrical chambers and for captively retaining and supporting the slider 65d between the tracks 60d. For permanently securing the strip 45d in its mounted position to the base 22d, mounting pins 147 of the strip may be sonically welded to the base 22d.

In accordance with a feature of this embodiment of the invention, the door 61d has a single shutter 62d adapted for easy snap action engagement with the slider 65d from the side of the cartridge following pre-assembly of the base 22d, cover 35d, strip 45d, and springs 67d. To this end, the shutter 62d has a mounting portion 150 disposed at a right angle at its upper end, as viewed in FIG. 34. The mounting portion 150 includes a pair of laterally spaced mounting flanges 151 that are positionable into opposite ends of a longitudinal slot 152 formed in a side of the slider 65d. For positively securing the mounting portion 150 to the slider 65d, the mounting portion 150 includes a locking flange 154 disposed between and slightly above the mounting flanges 151, as viewed in FIG. 34. The locking flange 154 has a depending locking lip 155 (FIG. 36) which is adapted to be forced over a locking lug 156 located centrally within the slot 152 of the slider 65d. For camming the locking flange 154 upwardly and over the locking lug 156 as the mounting flanges 151 enter the side slot 152 of the slider, the locking lug 156 is formed with a tapered camming surface 158. When the locking flange 156 reaches its mounted position, the lip 155 will snap downwardly into engaging relation with a rear locking surface of the lug 156, as depicted in FIG. 36.

Figure 38:
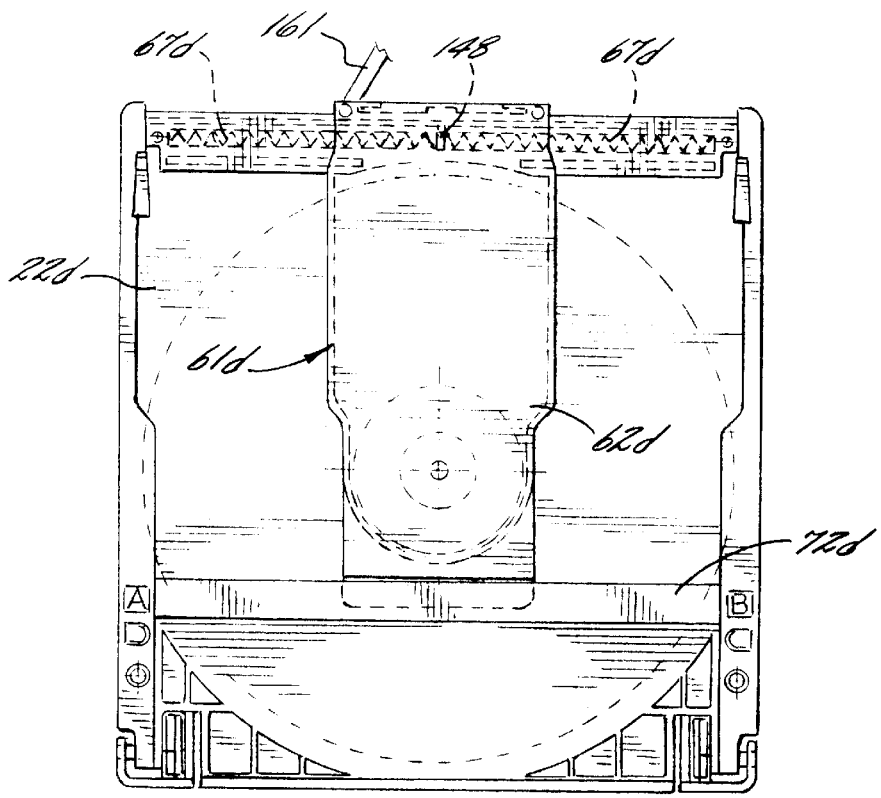
FIG. 38 is a side elevational view of the cartridge shown in FIG. 34 with the slidable door thereof in a closed condition.
Figure 39:
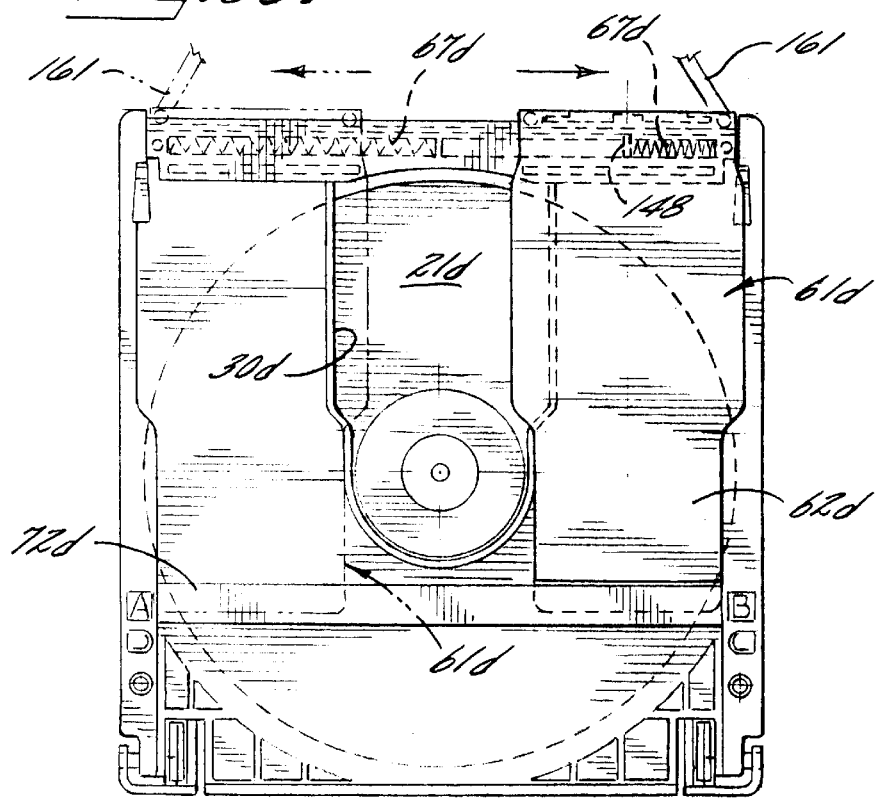
FIG. 39 is a side elevational view, similar to FIG. 38, illustrating alternative open conditions of the door.

To facilitate movement of the door 65d to an opening position upon insertion of the cartridge 20d into a disk drive, the slider 65d is formed with notches 160 at its opposite longitudinal ends and on a side opposite that upon which the shutter 162d is mounted (FIG. 34). Such notches 160 are adapted for receiving an actuating arm 161 of the disk drive at either longitudinal end of the slider 65d, depending upon the direction in which the door 61d is to be opened by the drive. As depicted in FIGS. 38 and 37, the door 61d can be opened in either direction, with the respective spring 67d returning the door to its normally closed position upon removal of the cartridge from the disk drive.

What is claimed is:

1. A protective cartridge for data information disks comprising front and rear walls that define a compartment for enclosing a data information disk, a sliding door movable from a closed position for covering said disk to an open position for exposing said disk during a read operation, said door including at least one shutter having a flat planar portion overlapping one of said walls, a slider upon which said at least one shutter is mounted, said slider being supported by said walls for relative sliding movement, said one side wall having an inner face on a side facing said compartment and an outer face on an opposite side thereof, said one side wall being formed with a transverse opening through a side thereof adjacent a lower end of said overlapping shutter, said overlapping shutter having a guide lip adjacent a lower end thereof which extends through said side opening in said one wall into position adjacent the inner face of said one wall for guiding movement of said door between closed and open positions.

2. The protective cartridge of claim 1 in which said walls are defined by a pair of interlocking shells, and said shells and slider define internal interengaging grooves and guide tracks for supporting said slider for movement between said closed and open positions.

3. The protective cartridge of claim 1 in which said lip is formed on a lateral extension of said overlapping shutter so that a lower perimeter of said overlapping shutter substantially closes said opening to prevent dust and particles from entering the cartridge.

4. The protective cartridge of claim 1 in which said opening communicates with said recess in said inner face of said one wall, and said guide lip extends rearwardly and downwardly from said overlapping shutter for movement within said recess.

5. The protective cartridge of claim 4 including a second shutter, and said shutters are connected together by a U-shaped mounting portion, and said U-shaped portion is adapted for snap action interengagement with said slider.

6. The protective cartridge of claim 1 in which said inner face of said one wall is formed with a recess for receiving said shutter guide lip and guiding movement thereof.

7. The protective cartridge of claim 6 in which said guide lip is received in said recess with an inner face of the guide lip substantially co-planar with the inner face of said one wall.

8. The protective cartridge of claim 7 in which the outer face of said one wall is recessed for receiving said overlapping shutter with an outer face of said shutter substantially co-planar with the outer face of said one wall.

9. A protective cartridge for data information disks comprising front and rear walls that define a compartment for receiving and containing a data information disk, a sliding door moveable from a closed position for covering said disk to an open position for exposing said disk during a read operation, said door including at least one shutter having a flat planar portion overlapping one of said walls, a separate slider mounted for relative sliding movement with respect to said walls, said slider being formed with a slot opening on one side thereof, and said one shutter having a mounting portion adapted for snap action interengagement with said side opening slot of the slider.

10. The protective cartridge of claim 9 in which one of said walls is defined by a cover pivotally mounted along a marginal end thereof for swinging movement between an open and closed position whereby a data information disk is positionable in said compartment when said cover is in said open position and is enclosed by said cover and said other wall when said cover is in said closed position.

11. The protective cartridge of claim 10 in which said one shutter is positioned in overlapping relation to a wall of said cartridge opposite said cover.

12. The protective cartridge of claim 10 in which said cartridge includes a base adapted for receiving a disk, and said cover is mounted for pivotal movement relative to said base.

13. The protective cartridge of claim 12 in which said cover is formed with a pair of co-axial laterally projecting hinge pins, and said base is formed with cylindrical recesses for receiving said hinge pins.

14. The protective cartridge of claim 13 including a mounting strip which together with said base defines guide tracks for supporting said slider for relative sliding movement.

15. The protective cartridge of claim 14 in which said base and mounting strip define cylindrical chambers on opposite lateral sides of said door each for receiving a respective return spring adapted for biasing said door toward a closed position.

16. The protective cartridge of claim 15 in which said base is formed with a centrally located access aperture, said door covering said aperture when in a closed position, said door being movable in either lateral direction with respect to said access aperture, and said slider having a depending pin disposed between said return springs for engaging a respective one of said return springs depending upon the direction in which said door is moved with respect to such access aperture.

17. The protective cartridge of claim 9 in which said mounting portion includes laterally spaced mounting flanges positionable into opposite ends of said slot, said slider being formed with a locking ledge located intermediate the ends of said slot, and said mounting portion includes a locking flange disposed between said mounting flanges for locking engagement with said locking ledge upon insertion of said mounting flanges into said slot.

18. The protective cartridge of claim 17 in which said locking ledge is formed with a tapered camming surface for camming said locking flange upwardly and over said locking lug upon insertion of said mounting flanges into said slot.

19. The protective cartridge of claim 9 in which said slider is formed with notches at its opposite longitudinal ends and on a side opposite said slot, said notches each being adapted for engagement by an actuating arm of a disk drive for effecting movement of said slider away from an open to a closed position.

20. A protective cartridge for data information disks comprising a base and a cover, a first hinge pivotally connecting a marginal end of said cover to said base for pivotal movement about a predetermined axis between open and closed positions relative to said base whereby a data information disk is positionable into said base when said cover is in said open position and is enclosed by said cover and said base when said cover is in said closed position, first and second access apertures in said base and said cover, respectively, and located adjacent opposite faces of said disk contained within the cartridge, a door having a mounting portion connected to said base for relative sliding movement, said door having first and second shutters associated with said first and second access apertures, respectively, said door being slidable relative to said cover and base between a first position in which each shutter covers its associated access aperture and a second position in which each shutter exposes its associated access aperture, and a second hinge for supporting said second shutter for swinging movement relative to said door mounting portion between an operative position and a raised position for permitting movement of said cover to said second position.

21. The protective cartridge of claim 20 in which said mounting portion and second shutter are formed with a plurality of interengaging extensions and slots pivotally connected by said second hinge.

22. The protective cartridge of claim 21 in which said extensions and slots have interengaging ball and socket joints adapted for snap action engagement during assembly of said second shutter to said mounting portion.

23. The protective cartridge of claim 22 in which said ball and socket joints are formed on axially aligned opposing sides of said extensions and slots.

24. The protective cartridge of claim 20 in which said shutters are made of plastic, and said second shutter is connected to said mounting portion by a living hinge.

25. The protective cartridge of claim 24 in which said living hinge is defined by a V-shaped recess formed in an outer face of said second shutter.

26. The protective cartridge of claim 20 in which said door includes a plastic slider supported by said base for relative sliding movement, said shutters being connected together by a U-shaped portion, and said U-shaped portion having an inwardly extending tongue adapted for snap action engagement with said slider.

27. The protective cartridge of claim 26 in which said slider is formed with a slot for receiving and positively retaining said tongue.

28. The protective cartridge of claim 27 in which said U-shaped portion and said shutters are made of plastic.

29. The protective cartridge of claim 26 in which said shutters and U-shaped portion comprise a single molded piece.

30. The protective cartridge of claim 27 in which said tongue has a laterally offset locking ledge, and said slider slot is formed with an undercut adapted for positively receiving and retaining the locking ledge of said tongue upon insertion of said tongue into said slider slot.

31. The protective cartridge of claim 30 in which said slider slot is located in off centered relation to a top end of said slider, and said slider slot is formed with a lower camming surface inclined in a direction toward said undercut for forcing the locking ledge of said tongue into interengaging relation with said undercut upon insertion of said tongue into said slot.

32. The protective cartridge of claim 20 in which said slider and base are formed with internal interengaging grooves and guide tracks for supporting the slider for relative sliding movement.

* * * * *